United States Patent

[11] 3,574,912

| [72] | Inventor | Rupert Kraft<br>8 Pierlstrasse 9020, Klagenfurt, Austria |
|---|---|---|
| [21] | Appl. No. | 747,372 |
| [22] | Filed | July 24, 1968 |
| [45] | Patented | Apr. 13, 1971 |
| [32] | Priority | July 26, 1967 |
| [33] | | Austria |
| [31] | | A6940 |

[54] PRESSURIZED CYLINDRICAL ROLLER ARRANGEMENT
2 Claims, 6 Drawing Figs.

[52] U.S. Cl............................................. 29/113,
101/348
[51] Int. Cl....................................... B41i 35/00
[50] Field of Search........................... 29/129,
113, 115, 116, 132, 123; 101/(Electrostatic
Digest), 212, 216, 348; 271/(Magn. Dig.); 118/58;
152/330, 53, 56, 57; 51/363, 373; 38/101, 100, 49

[56] References Cited
UNITED STATES PATENTS

| 207,287 | 8/1978 | Koons.......................... | 29/113 |
| 2,395,915 | 3/1946 | Specht......................... | 29/115X |
| 3,067,718 | 12/1962 | Kraft............................ | 118/58 |
| 3,168,760 | 2/1965 | Olcott.......................... | 29/132X |
| 1,444,314 | 2/1923 | Herder......................... | 29/123 |

FOREIGN PATENTS

| 14,881 | 1884 | Great Britain................ | 29/123 |
| 281,202 | 12/1914 | Germany...................... | 29/123 |

Primary Examiner—Billy J. Wilhite
Assistant Examiner—Leon G. Machlin
Attorney—Wenderoth, Lind and Ponack ABSTRACT: A cylindrical roller arrangement including a roller having two frontal endpieces and a thin, flexible, tight surface closed foil secured to said endpieces. The endpieces are movable relative to one another in axial direction and the axial distance of said endpieces is determined by the surface foil. A part zone of the inner hollow space of the roller adjacent the inside wall of the surface foil as well as the frontal endpieces have the form of a fluid gastight hollow body. The hollow body is filled with a pressure medium exerting a regular pressure on the inside wall of the surface foil as well as on the inside walls of the endpieces. The pressure on the inside walls of the endpieces causes an enlargement of the axial distance of the two endpieces and an axial stretching of the surface foil so that the foil keeps its accurately cylindrical surface.

Patented April 13, 1971  3,574,912

RUPERT KRAFT,
INVENTOR.

BY Wanderoth, Lind & Ponack
Attorneys

Patented April 13, 1971

RUPERT KRAFT,
INVENTOR.

BY Wenderoth, Lind & Ponack
Attorneys

PRESSURIZED CYLINDRICAL ROLLER ARRANGEMENT

The invention relates to a cylindrical roller, particularly in machines or devices for treating flat material, e.g. a printing roller, support roller, guide roller or the like.

Such cylindrical rollers have usually been solid rollers so far. Thus, the stability required, particularly a sufficient resistance against bending stresses has been obtained, but a considerable weight had to be taken into consideration.

It is an object of the invention to create a cylindrical roller which, besides having a small weight, is stable and resistant against bending stresses.

According to the invention this is obtained by two frontal endpieces and at least one thin, flexible, tight surface foil forming the connection between the two endpieces determining the distance of the endpieces, at least a partial zone of the inner hollow space of the roller adjacent the inwall of the surface foil as well as the frontal endpieces having the form of a liquid and/or gastight hollow space which is filled with a pressure medium exerting a regular pressure on the inwall of the surface foil as well as on the inwalls of the endpieces.

It is important above all that the pressure medium exerts not only a radial pressure onto the surface foil, but also a pressure in axial direction onto the frontal endpieces. As the distance between the two frontal endpieces is not determined by a rigid distance piece, but the connection between the two endpieces determining the axial distance of the endpieces is given by the surface foil, said surface foil is axially tensioned by the axial pressure of the pressure medium of the endpieces, which prevents the surface foil from curving outwardly (which would be the case with radial pressure only) and which gives the roller the stability and resistance against bending stresses required in interaction with the radial pressure. Here the roller according to the invention greatly differs from the known inflatable rollers U.S. Pats. No. 3,166,013 and No. 3,295,188, German Utility Model No. 1,886,521, in which a radial pressure is exerted only, but the surface foil is not axially tensioned by the pressure of the pressure medium.

The medium exerting pressure onto the inwall of the surface foil can conveniently be a gas or liquid. The pressure medium can fill the whole inside space of the roller or an annular space adjacent the inwall of the surface foil, said annular space being sealed against the axis of the roller by a conveniently cylindrical dividing wall.

In certain cases, e.g. if the roller according to the invention is a printing roller, the roller has to be pressed against a backing body. This may be done—as in known solid rollers—by means of pivot pins provided on the frontal endpieces or—above all if high surface pressure is required—by means of a pressure body arranged inside the roller, which is conveniently pressed against the backing body under the action of magnetic forces. At least one of said working elements acting upon each other (pressure body, backing body) has to be a magnet body and the other has to consist at least partially of magnetizable material. The inner pressure body and the backing body lying outside the cylindrical roller can be pressed against each other by mechanical, hydraulic or pneumatic means. Another possibility of realizing the pressure of the cylindrical roller according to the invention against the backing body consists in that the surface foil is made of magnetizable material (or is at least provided with such a layer) and that the backing body is a magnet body. Thus a magnetic pressure is obtained without any internal pressure body.

If the roller according to the invention is a printing roller, the outside of the surface foil is provided with the actual printing form which is e.g. manufactured by etching, by a photochemical treatment or by electrodeposition. The printing form is shaped in accordance with the requirements of the printing method used (high, gravure, surface printing). The inking is effected from outwards by means of inking devices and/or moistening devices (in accordance with the printing method). It is convenient that the working elements of the inking device and/or moistening device engaging on the surface of the printing roller are magnetically held in position by means of pressure bodies adjacent the inwall of the surface foil of the roller.

Embodiments of the invention are hereinafter described in detail with reference to the accompanying drawings.

Figure 1:
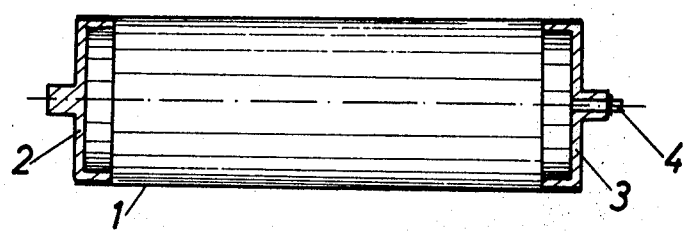
FIG. 1 is an axial section of an embodiment of a printing roller according to the invention.

The printing roller according to FIG. 1 consists of a surface 1 made of a thin, flexible, gas or liquid-tight foil closed in itself. On the front sides, the surface 1 is mounted on the end discs 2, 3 in such manner that the inside space of the printing roller is closed, gas or liquidtight, and is only accessible by a valve 4 in the end disc 3. A gaseous or liquid pressure medium can be led in or off by means of the valve 4. In operation, the inside space of the cylindrical printing roller is filled with pressure medium, a regular pressure being exerted on the inwall of the surface 1 and the end discs 2, 3. Thus, the cylindrical printing roller remains stable, though extremely light.

Such a printing roller can be inserted into the printing machine in the usual way like a known massive printing roller and can be laid over pins provided on the end discs 2, 3. This is the case if high pressure is not required.

Figure 2:
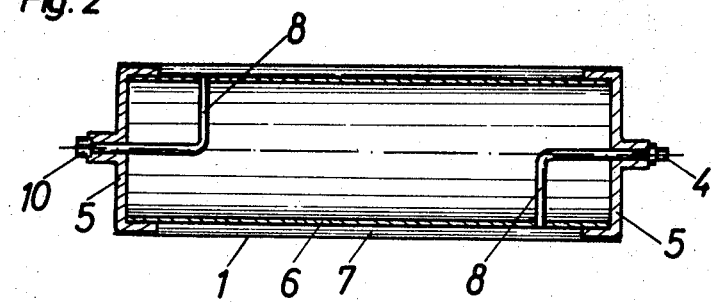
FIG. 2 is an axial section of a further embodiment of a printing roller.

In the printing roller according to FIG. 2, a surface 1 of a thin, flexible, gas, or liquidtight cylinder foil is provided which is mounted on two equal end discs 5. The cylindrical flanges of said end discs 5 are tightly mounted on an inner tube 6 and are movable in axial direction. The annular hollow space between the inwall of the surface 1 and the tube 6 is connected with the valve 4 in one of the end discs 5 over a hose pipe 8 and can thus be fed with a gaseous or liquid pressure medium. Whereas the embodiment according to FIG. 1 is particularly adapted for a gaseous medium, e.g. pressure air, the embodiment according to FIG. 2 is, above all, adapted for a liquid pressure medium, e.g. pressure oil. In the case of the liquid pressure medium the air can pass off through an opening provided with a locking screw 10 in the other end disc 5. This opening is connected with the annular hollow space through pipe 8 like the valve 4.

The printing roller according to FIG. 2 can be inserted into the printing machine like the one according to FIG. 1.

Figure 3:
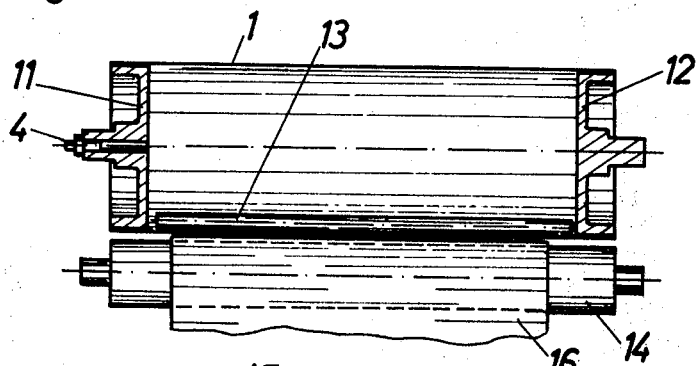
FIG. 3 is an axial section.
Figure 4:
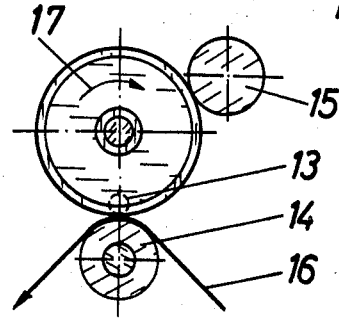
FIG. 4 is a frontal section of a printing roller according to the invention, showing a diagram of a printing station in a printing machine.

In the case of high pressure, a pressure according to the embodiment of FIGS. 3 and 4 is convenient. The printing roller consists of a surface 1 like in FIGS. 1 and 2 and of end discs 11, 12; the end disc 11 is provided with a valve 4. As shown in FIG. 1, a gaseous pressure medium is led into the inner space. A further roller 13 of magnetizable material is arranged in the inner space of the printing roller which acts as a pressure body and is attracted by the magnet roller 14. The magnet roller 14 forms the backing body and the support of the material to be printed 16. The inking of the printing form on the surface of the printing roller is done by an inking device which is shown in diagram by the inking roller 15. The arrow 17 shows the direction of rotation of the printing roller.

Figure 5:
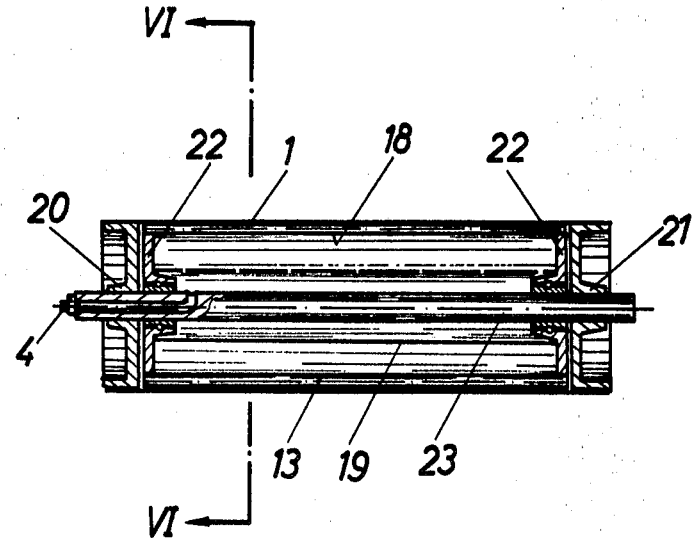
FIG. 5 is an axial section of another embodiment of a printing roller according to the invention.
Figure 6:
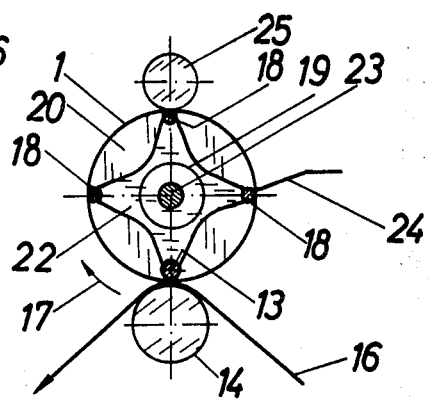
FIG. 6 is a section along VI–VI of FIG. 5, showing some additional working elements of the printing machine.

In the embodiment according to FIGS. 5 and 6, the mentioned surface 1 of the printing roller is mounted on end discs 20, 21 which close the printing roller gas or liquidtight, i.e. also against the shaft 23, which crosses the end discs 20, 21 and is provided with a bore having a valve 4 within the zone of one end disc 20; the gaseous pressure medium is led through said bore. Said bore opens into the inner space of the printing roller. Two bearing supports 22, freely extensible, are provided on the shaft 23 and are connected with each other by a distance tube 19 provided with several bores. Rollers 13 and 18 are revolubly mounted in the bearing supports 22, movable towards the inwall of the surface 1, the roller 13 consisting of magnetizable material and being attracted by the magnet roller 14 over which the material to be printed is run. The rollers 18 can be permanent magnet rollers and act as pressure bodies by which several working elements of the printing machine, e.g. the inking roller 25 or the scraper 24, are attracted and are pressed against the surface of the printing roller provided with the printing form. As the bearing supports 22 are freely revolubly mounted on the shaft 23, they are held in position by the magnetic action between the rollers 13 and 18 on the one hand and the magnet roller 14 and the scraper 24 or the inking roller 25 on the other, whereas the surface 1 provided with the end discs 20 and 21 and the shaft 23 of the printing roller revolves in direction of the arrow 17.

It is also possible to use an axis instead of the shaft 23 which is provided with the bearing supports 22 and stands still, when the surface 1 provided with the end discs 20, 21 of the printing roller revolves.

In the case of the embodiment according to FIGS. 3 and 4 as well as 5 and 6, it is convenient that a small quantity of oil is provided inside the printing roller so that the rollers 13 or 18 roll off an oil film.

The roller constructions as described can also be applied, if the rollers are not used as printing rollers, but e.g. as support rollers or guide rollers. In this case the printing form on the outside of the surface foil is avoided.

The surface foil may consist of a material corresponding to the purpose of use of the roller according to the invention, e.g. of nickel (the surface foil is produced by electrodeposition) or highly polymeric material. Foils of several layers e.g., compound foils of different material, can be used as surface foils.

I claim:

1. A roller arrangement comprising a roller having two frontal endpieces, at least one thin, flexible, tight surface foil closed in itself secured to said endpieces, said endpieces being movable relative to one another in axial direction, the axial distance of said endpieces being determined by said surface foil, at least one part zone of the inner hollow space of said roller adjacent the inside wall of said surface foil as well as said frontal endpieces having the form of a fluid gastight hollow body, said hollow body being filled with a pressure medium exerting a regular pressure on the inside wall of said surface foil as well as on the inside walls of said endpieces, said pressure onto the inside walls of said endpieces causing an enlargement of the axial distance of the two endpieces and an axial stretching of the surface foil so that said foil maintains accurately its surface, at least one pressure body adjacent the surface inside wall in said inner hollow space, at least one backing body arranged outside said roller, one pressure body and one backing body forming a pair of working elements attracted by magnetic force, at least one of said working elements of each pair being a magnet body, the other consisting at least partially of magnetizable material, and a freely revoluble bearing support for said pressure body, said pressure body being movable in the direction of the inside wall of said surface foil.

2. A roller arrangement comprising a roller having two frontal endpieces, at least one thin, flexible, tight surface foil closed in itself secured to said endpieces, said endpieces being movable relative to one another in axial direction, the axial distance of said endpieces being determined by said surface foil, at least one part zone of the inner hollow space of said roller adjacent the inside wall of said surface foil as well as said frontal endpieces having the form of a fluid gastight hollow body, said hollow body being filled with a pressure medium exerting a regular pressure on the inside wall of said surface foil as well as on the inside walls of said endpieces, said pressure onto the inside walls of said endpieces causing an enlargement of the axial distance of the two endpieces and an axial stretching of the surface foil so that said foil maintains accurately its surface, at least one pressure body adjacent the surface inside wall in said inner hollow space, at least one backing body arranged outside said roller, one pressure body and one backing body forming a pair of working elements attracted by magnetic force, at least one of said working elements of each pair being a magnet body, the other consisting at least partially of magnetizable material, said roller being a printing roller, working elements of an inking device engaging on said surface, said working elements being magnetically held in position by means of said pressure body, said pressure body arranged inside said roller being magnet rollers and said working elements of the inking and/or moistening device adjacent outside consist at least partially of magnetizable material.